United States Patent
Cheng et al.

(10) Patent No.: US 7,880,118 B2
(45) Date of Patent: Feb. 1, 2011

(54) METHOD FOR CUTTING NONMETAL MATERIAL

(75) Inventors: Yuan-Chieh Cheng, Hsinchu (TW);
Kuo-Cheng Huang, Hsinchu (TW);
Hui-Hsiung Lin, Hsinchu (TW);
Wen-Hong Wu, Hsinchu (TW)

(73) Assignee: Instrument Technology Research Center, National Applied Research Laboratories, Hsinchu (TW)

( * ) Notice: Subject to any disclaimer, the term of this patent is extended or adjusted under 35 U.S.C. 154(b) by 1053 days.

(21) Appl. No.: 11/649,534

(22) Filed: Jan. 4, 2007

(65) Prior Publication Data

US 2008/0074747 A1   Mar. 27, 2008

(30) Foreign Application Priority Data

Sep. 6, 2006   (TW) ............................... 95132976 A (51) Int. Cl.
*B23K 26/00* (2006.01)
(52) U.S. Cl. ............................. 219/121.72; 219/121.67; 225/2; 225/93.5
(58) Field of Classification Search ............ 219/121.67, 219/121.72; 264/400; 225/2, 93.5
See application file for complete search history.

(56) References Cited

U.S. PATENT DOCUMENTS 6,489,588 B1 * 12/2002 Hoekstra et al. ........ 219/121.67
2002/0046997 A1 * 4/2002 Nam et al. .............. 219/121.72
2003/0209528 A1 * 11/2003 Choo et al. ............. 219/121.72
2004/0251290 A1 * 12/2004 Kondratenko .................. 225/2
2005/0160891 A1   7/2005 Koch
2006/0278619 A1 * 12/2006 Acker et al. ........... 219/121.67
2007/0284785 A1 * 12/2007 Hoekstra .................... 264/400

FOREIGN PATENT DOCUMENTS

| JP | 07-323384 A | * 12/1995 |
|---|---|---|
| JP | 2001300753 A | 10/2001 |
| JP | 2001300754 A | 10/2001 |
| JP | 2002100825 A | 4/2002 |
| JP | 2005169472 A | 6/2005 |
| TW | 496807 | 8/2002 |
| TW | 526111 | 4/2003 |
| TW | 580485 | 3/2004 |
| TW | I227179 | 2/2005 |
| TW | I243081 | 11/2005 |
| TW | I251519 | 3/2006 |

* cited by examiner

*Primary Examiner*—Geoffrey S Evans
(74) *Attorney, Agent, or Firm*—Volpe and Koenig P.C.

(57) ABSTRACT

A method for cutting a nonmetal material is provided. The method includes steps of (a) generating a tension stress on a surface of the nonmetal material by exerting a bending stress thereon; (b) providing a thermal effect along a path direction on the surface, wherein the thermal effect grows along a direction opposite to the path direction; (c) providing a first cryogenic effect in a first incident direction along the path direction; and (d) providing a second cryogenic effect in a second incident direction along the path direction, wherein a crack along the path direction on the surface is formed as a result of the tension stress, the thermal effect, and the cryogenic effects therealong for cutting the nonmetal material.

20 Claims, 5 Drawing Sheets

Fig. 5 a nonmetal material. More particularly, the present invention
METHOD FOR CUTTING NONMETAL MATERIAL

FIELD OF THE INVENTION

The present invention relates to a method for cutting a nonmetal material. More particularly, the present invention relates to a method of providing thermal and cryogenic effects for cutting nonmetal material.

BACKGROUND OF THE INVENTION

To meet extremely increasing demands for LCD glass substrates and the necessary low thermal stress in fabrication therefor for growing development of the mobile phone and liquid crystal display (LCD) TV industry, the method of thermal rupture by laser now gradually supersedes traditional diamond blade abrasion and laser melting for cutting, and becomes a leading method in LCD glass substrate fabrication of the next generation electro-optical industry.

The method of thermal rupture by laser is differentiated from laser melting in that the principle of thermal rupture is applied in the process of cutting. Due to the uniform laser thermal effects and finite affected surface range thereby, the advantages of sharp and flat cut surface, low residual thermal stress, and high speed in fabrication process are far unachievable to traditional methods of laser melting and diamond blade.

Gas state $CO_2$ laser and solid state YAG laser respectively with wavelengths of 10.6 μm and 1.064 μm are currently applied in the business. Stable laser through an optical lens is focused to provide a thermal field on a glass substrate. Subsequently, adequate cryogenic effects are provided thereon to initiate a primary crack on the edge thereof. The crack develops steadily through the stress intensity factor field formed by the thermal and cryogenic fields, through which a desired cutting result is presented. However, the arrangements for cooling and heating sources are tested by trial to obtain optimal parameters for laser cutting, and therefore related principles of speed and configuration of cutting are comparatively absent.

In order to overcome the drawbacks in the prior art, a method for cutting a nonmetal material is proposed through arduous experiments and research.

SUMMARY OF THE INVENTION

It is a first aspect of the present invention to provide thermal and cryogenic effects for cutting a nonmetal material.

It is a second aspect of the present invention to provide a thermal effect for cutting a nonmetal material along a cutting path direction thereon, wherein the thermal effect grows along a direction opposite thereto.

It is a third aspect of the present invention to provide a method for cutting a brittle material, comprising steps of (a) generating a tension stress on a surface of the brittle material by exerting a bending stress thereon; (b) providing a thermal effect along a path direction on the surface, wherein the thermal effect grows along a direction opposite to the path direction; (c) providing a first cryogenic effect in a first incident direction along the path direction, wherein the first incident direction includes a first incident direction component and meets the path direction at a first angle; and (d) providing a second cryogenic effect in a second incident direction along the path direction, wherein the second incident direction includes a second incident direction component and meets the path direction at a second angle, and the first incident direction component, the second incident direction component and the path direction are coplanar, wherein a crack along the path direction on the surface is formed as a result of the tension stress, the thermal effect, and the cryogenic effects therealong for cutting the brittle material.

Preferably, the first and second cryogenic effects respectively grow along the first and the second incident direction components.

Preferably, each of the first and second angles is between 0 and 90 degrees.

Preferably, each of the first and the second direction components meets the path direction at an angle of 60 degrees.

It is a forth aspect of the present invention to provide a method for cutting a nonmetal, comprising steps of (a) providing a thermal effect along a path direction on the nonmetal, wherein the thermal effect grows along a direction opposite to the path direction; and (b) providing a first cryogenic effect in a first incident direction along the path direction, wherein a crack along the path direction is formed as a result of the thermal and the first cryogenic effect therealong for cutting the nonmetal.

Preferably, the thermal effect is provided by a first laser beam.

Preferably, the first laser beam is adjusted by a diffractive optical device.

Preferably, the method further comprises a step of guiding a second laser beam following the first laser beam along the path direction.

Preferably, the method further comprises a step of providing a second cryogenic effect in a second incident direction along the path direction, wherein the first and the second incident directions respectively include a first and a second incident direction components, which are coplanar with the path direction.

Preferably, the first and second cryogenic effects respectively grow along the first and the second incident direction components.

Preferably, the first incident direction component meets the path direction at a first angle, the second incident direction component meets the path direction at a second angle, and each of the first and the second angles is between 0 and 90 degrees.

Preferably, the path direction is between the first and the second incident direction components.

Preferably, each of the first and the second incident direction components meets the path direction at an angle of 60 degrees.

Preferably, each of the first and the second cryogenic effects is provided through one selected from a group consisting of water, air, and nitrogen.

Preferably, each of the first and second cryogenic effects is provided by one of a single nozzle and a multi-nozzle cooling sources.

Preferably, the nonmetal is one of a single layer and a multi-layer materials.

Preferably, the nonmetal is a glass substrate.

It is a fifth aspect of the present invention to provide a cutting system for a glass substrate. The cutting system comprises a tension generating device generating a tension stress on a surface of the glass substrate; a first heat source exerting a thermal effect along a path direction on the surface, wherein the thermal effect grows along a direction opposite to the path direction; a first cooling source to provide a first cryogenic effect in a first incident direction along the path direction, wherein the first incident direction includes a first incident direction component and meets the path direction at a first angle; and a second cooling source to provide a second cryogenic effect in a second incident direction along the path direction, wherein the second incident direction includes a second incident direction component and meets the path direction at a second angle, and the first direction component, the second direction component, and the path direction therebetween are coplanar, wherein a crack along the path direction on the surface is formed as a result of the tension stress, the thermal effect, and the cryogenic effects therealong for cutting the glass substrate.

Preferably, the first heat source provides a first laser beam through a diffractive optical device to exert the thermal effect.

Preferably, the cutting system further comprises a second heat source to guide a second laser beam following the first laser beam along the path direction.

Preferably, the first and the second cryogenic effects respectively grow along the first and the second incident direction components.

Preferably, each of the first and the second angles is between 0 and 90 degrees.

Preferably, each of the first and the second direction components meets the path direction at an angle of 60 degrees.

Preferably, the tension generating device provides a force of bending stress to generate the tension stress.

Other objects, advantages and efficacies of the present invention will be described in detail below taken from the preferred embodiments with reference to the accompanying drawings, in which:

DETAILED DESCRIPTION OF THE PREFERRED EMBODIMENT

The thermal field generated by laser in the cutting process on nonmetal materials as glass substrate is classified into transient and quasi-static zones. In the initiated transient zone, an initial crack is generated on the surface of the substrate when strength of stress factor field ($K_1$) of transformation of temperature distribution field through thermal weight function by focused laser necessarily exceeds the critical strength of stress factor field ($K_{c1}$) of the glass substrate to critically resist rupture. The temperature distribution field and the stress factor field would grow more intense upon initiation of the crack, and the development thereof would be accelerated accordingly. Correspondingly, optimal incident angles by configuration of heating and cooling source and auxiliary cutting device are thus provided on the basis of thermal weight function from the method of thermal rupture cutting in the present invention.

The thermal weight function originates from the customary weight function applied in the mechanical loading, which refers to the ratio of the stress strength factor by a set of loading on the cutting edge of a crack to that by a standard set of loading on the cutting edge of the crack. Provided that a series of loading system is exerted on the crack carrier, the overall stress strength factor value for the crack cutting edge by the system is obtained through integration of weight function of each loading set thereof. On the basis of the abovementioned concept, in 1970 Bueckner proposed the theory of weight function. In 1979, Stern pioneered in the concept of weight function application to a system of thermal loading. In 1987, Tsai and Ma proposed a deviation of the thermal weight function $h^T$ distinct from Stern's theory by utilizing the theory of thermal interchange of elasticity, wherein the stress strength factor of thermal loading is simplified as following:

$$K_1^{(2)} = \frac{\alpha H}{2K_1^{(1)}} \int_B T^{*(2)} \cdot \frac{\partial \sigma_{kk}^{(1)}}{\partial a} dV \qquad (1)$$

$$h^T = \frac{\alpha H}{2K_1^{(1)}} \frac{\partial \sigma_{kk}^{(1)}}{\partial a}$$

In the formula 1, the stress strength factor $K_1$ of the system of thermal loading is derived through integration of volume V, wherein the temperature distribution field $T^*$ is multiplied by the thermal weight function $h^T$. Herein the temperature distribution field under consideration of a uniform thermal conductor of nonmetal material with semi-infinity crack based on governing equation of thermal fluid theory of moving heat source by Rosenthal in 1941 derives the following formula 2:

$$T = T_0 + \frac{q}{2\pi k} \frac{1}{h} \exp\left(\frac{-vx}{2a}\right) \overline{K_0}\left(\frac{vr}{2a}\right); r = \sqrt{x'^2 + y'^2}; a = \frac{k}{\rho c} \qquad (2)$$

In the formula 2, $T_0$ is the initial temperature, k is the thermal conductive coefficient of the material, q is the heat source, h is the thickness of the thermal conductor, v is the heat source speed, x' and y' are axes in the moving coordinate of the moving heat source, $\overline{K_0}$ is the modified zero-order Bessel function in the second category, ρ is the material density, and c is the heat capacity. As for the fabrication process by laser, the thermal weight function therein is simply determined through calculation for I-type stress $h^T$ as the following formula 3, through which partial differentiation to "a" in the formula 3 derives the formula 4:

$$\begin{Bmatrix} \sigma_{11} \\ \sigma_{22} \\ \sigma_{33} \end{Bmatrix} = \frac{k_1}{\sqrt{2\pi r}} \cos(\theta/2) \begin{Bmatrix} 1 - \sin(\theta/2)\sin(3\theta/2) \\ \sin(\theta/2)\cos(3\theta/2) \\ 1 + \sin(\theta/2)\cos(3\theta/2) \end{Bmatrix}; \qquad (3)$$

$$r = \sqrt{(x-a)^2 + y^2}$$

$$\frac{\partial \sigma_{kk}}{\partial a} = \sqrt{\frac{2}{k}} k_1 \frac{\cos(3\theta/2)}{r^{3/2}} \qquad (4)$$

Figure 1:
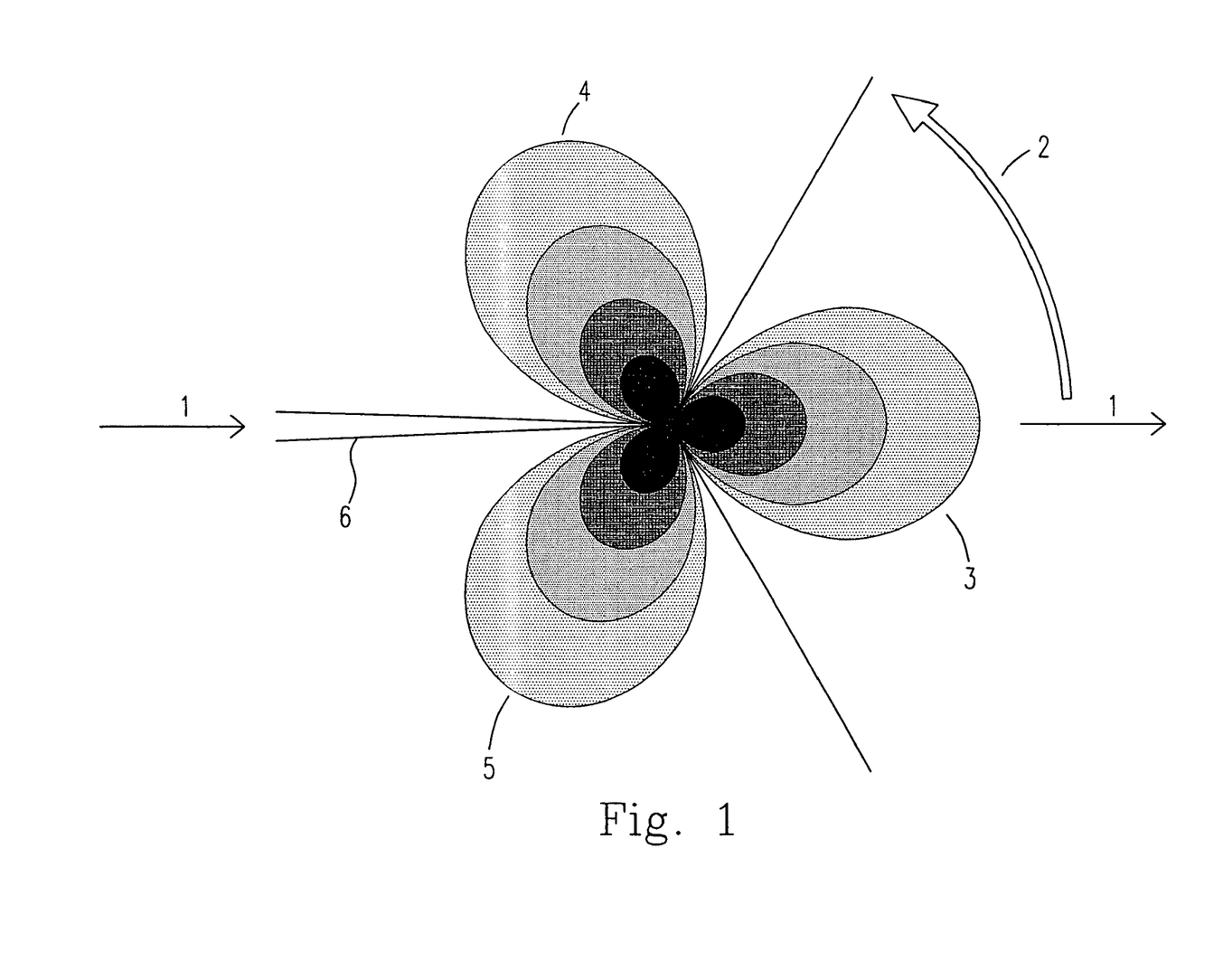
FIG. 1 is a diagram showing the distribution of thermal weight functions in the present invention.
Figure 2:
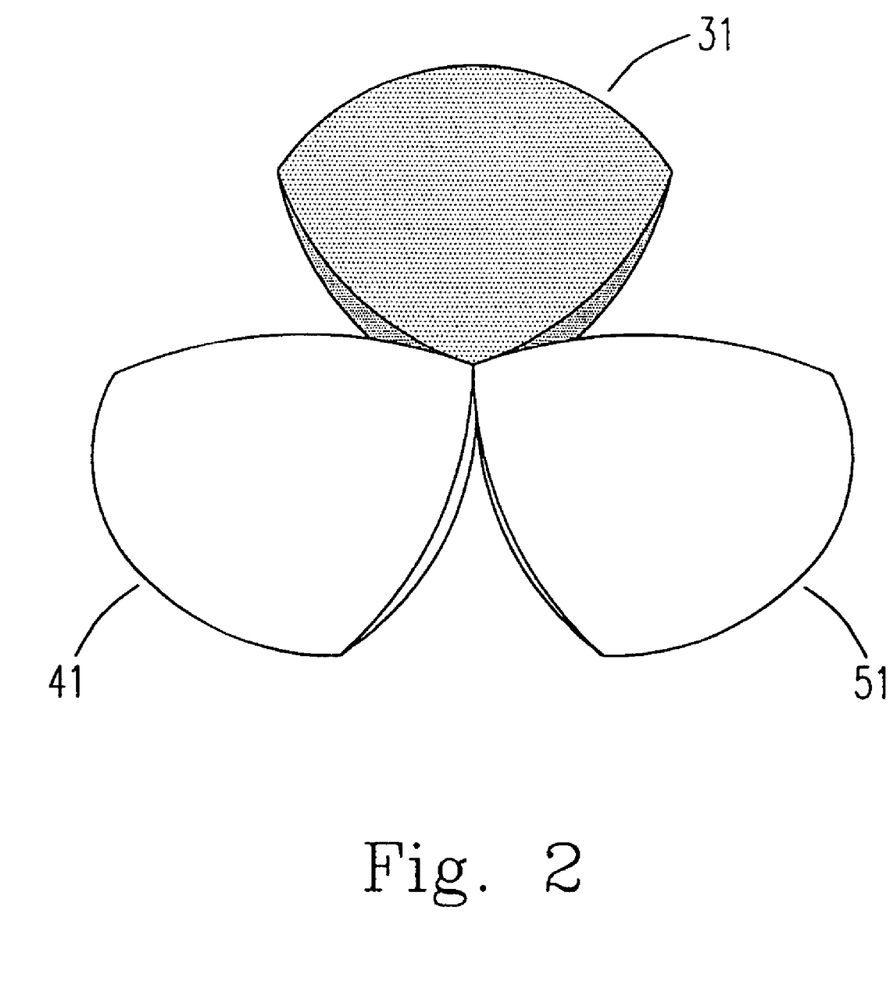
FIG. 2 is a diagram showing the temperature distribution field in the present invention.

It is demonstrated from the formula 4 that at the crack peak the singularity of $r^{-3/2}$ for the thermal weight function is more intense compared to that of $r^{-3/2}$ for stress. That is to say, utilizing the combination of cryogenic and thermal effects facilitates yet more development of the crack than external mechanical force. For exploring the optimal distribution conditions of the cooling and heat sources, the equivalent value contour of $$\frac{\partial \sigma_{kk}}{\partial a}$$

is sketched as shown in FIG. 1, wherein the thermal weight functions are only located at three districts of the peak of the crack 6 for the cryogenic and thermal effects in the temperature distribution field. Provided that the degree 2 is initiated from the cutting path direction 1, the three districts would separately be a positive thermal weight area 3 defined by the degree 2 between $-\pi/3$ and $\pi/3$, a first negative thermal weight area 4 defined by the degree 2 between $\pi/3$ and $\pi$, and a second negative thermal weight area 5 defined by the degree 2 between $-\pi$ and $-\pi/3$, whereas for the degree 2 equal to $-\pi/3$, $\pi/3$, or $\pi$, the temperature distribution field provides no contribution to the development of the crack 6. Accordingly, it would be desirable that a high temperature distribution field 31 is provided along the cutting path direction 1, and a first low temperature distribution field 41 and a second low temperature distribution field 51 corresponding to FIG. 2 are separately generated in a first incident direction 14, defined by the degree 2 of $2\pi/3$, and a second incident direction 21, defined by the degree 2 of $-2\pi/3$, to provide a thermal effect 39 growing along a direction opposite to the cutting path direction, and a first cryogenic effect 16 and a second cryogenic effect 24 respectively growing along the directions 14 and 21. Therefore, maximal strength of stress factor field ($K_1$) exceeding critical strength of stress factor field ($K_{c1}$) of the glass substrate to critically resist rupture would be generated by transformation of the cryogenic and thermal effects through the thermal weight function to provide an initial crack on the material surface being subsequently cut.

Figure 3:
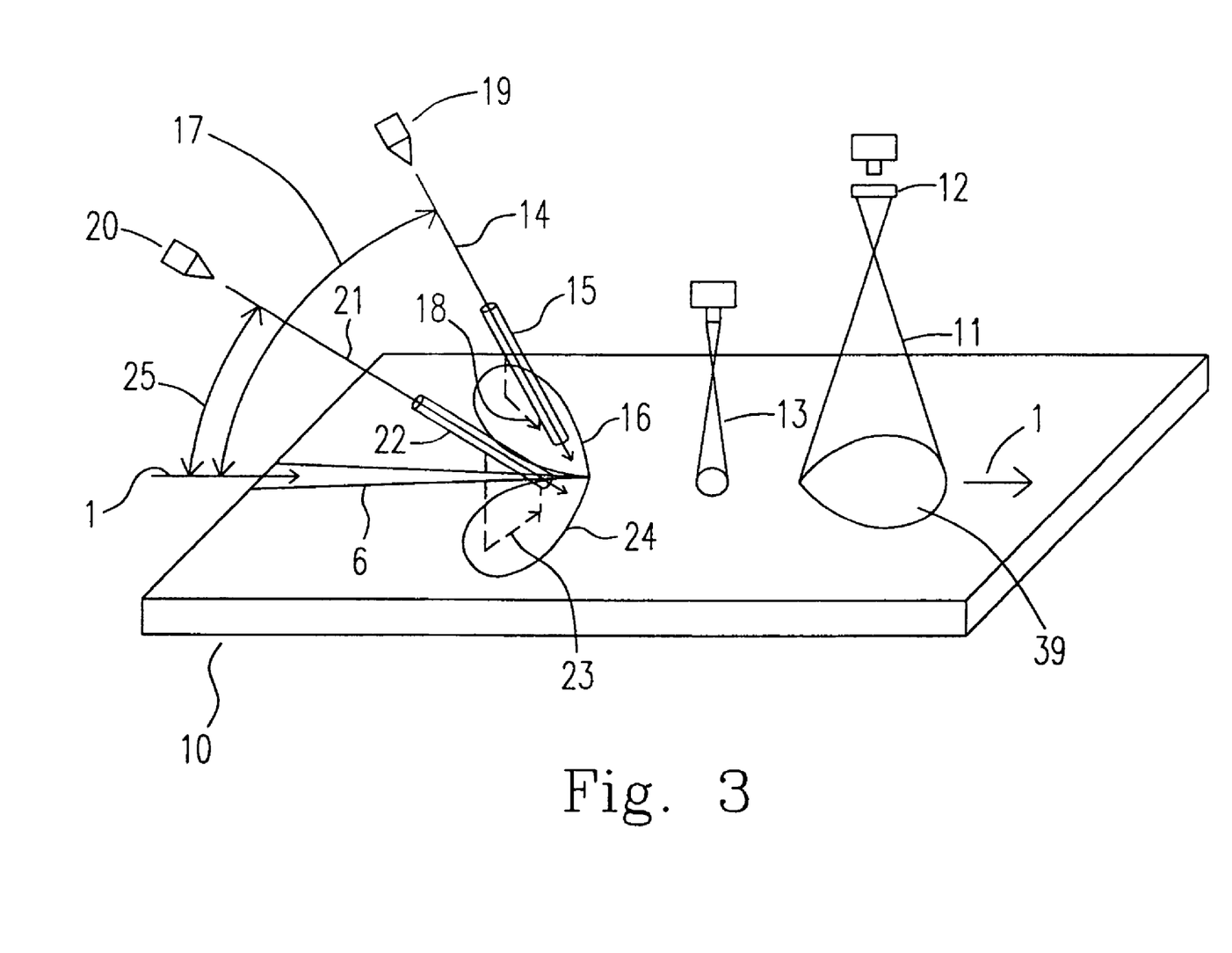
FIG. 3 is a diagram showing the method for cutting a nonmetal material according to a preferred embodiment of the present invention.

Please refer to FIG. 3, which is a diagram showing the method for cutting a nonmetal according to a preferred embodiment in the present invention, generally applicable to a single-layer brittle material, a double-layer material, a multi-layer material, and a glass substrate. In the first place, a thermal effect 39 is provided along a predetermined cutting path direction 1 on the nonmetal material 10. Desirably, the thermal effect 39 grows along a direction opposite to the cutting path direction 1, wherein the thermal effect 39 is generated by adjusting and focusing a first laser beam 11 to form a fan cross section therein through a diffractive optical device 12, so that the first laser beam 11 could have extremely high effective thermal weight values, and more operation power therefor is thus reduced to spare the cost. Furthermore, a second laser beam 13 is guided along the cutting path direction 1 following the first laser beam 11, through which the necessary ratio of the thermal weight to the power of laser on the cutting path direction 1 could be effectively increased for facilitating the cutting speed.

Subsequently, a first cryogenic effect 16 is provided along the cutting path direction 1 by a first cryogenic agent 15, which is generated in a first incident direction 14 by a first cooling source 19. As shown in FIG. 1, because a cryogenic phenomenon occurring in the first negative thermal weight area 4 could increase the ratio of thermal weight to power ($h^T/q$) and raise the quality and speed for cutting, a first angle 17 where the first incident direction 14 meets the cutting path direction 1 is desirably between 0 and 90 degrees. A first incident direction component 18 on the plane for the cutting path direction 1 from the projection of the first incident direction 14 manages to provide an oblique jet effect, so that the first cryogenic effect 16 would grow along the first incident direction component 18, which desirably meets the cutting path direction 1 at an angle of 60 degrees to effectively raise the negative thermal weight effect during the cutting process. According to the limitation conditions of the operation environment and the realistic workpiece to be cut, the first cryogenic agent 15 manages to be selected from a group consisting of water, air, and nitrogen, and one of a single nozzle or a multi-nozzle source is correspondingly adopted for the first cooling source 19.

Similar to the incident procedures for the first cooling source 19, a second cryogenic effect 24 is provided by a second cryogenic agent 22 generated by a second cooling source 20 in a second incident direction 21 along the cutting path direction 1. Correspondingly as shown in FIG. 1, because the cryogenic phenomenon occurring in the second negative thermal weight area 5 could still increase the ratio of thermal weight to power ($h^T/q$) and raise the quality and speed for the cutting process, a second angle 25 where the second incident direction 21 meets the cutting path direction 1 is desirably between 0 and 90 degrees. A second incident direction component 23 on the plane for the cutting path direction 1 from the projection of the second incident direction 21 manages to provide another oblique jet effect, so that the second cryogenic effect 24 would grow along the second incident direction component 23, which desirably meets the cutting path direction 1 at another angle of 60 degrees to effectively raise the negative thermal weight effect during the cutting process.

Still according to the limitation conditions of the operation environment and the realistic workpiece to be cut, the second cryogenic agent 22 manages to be selected from a group consisting of water, air, and nitrogen, and one of a single nozzle or a multi-nozzle source is correspondingly adopted for the second cooling source 20. As a result, the thermal effect 39, the first cryogenic effect 16, and the second cryogenic effect 24 are correspondingly transformed by the thermal weight functions respectively in the positive thermal weight area 31, the first negative thermal weight area 32, and the second negative thermal weight area 33 in FIG. 1 into a necessarily exceeding strength of stress factor field for the nonmetal material 10 to be cut, and thus a crack 6 is formed thereon.

Figure 4:
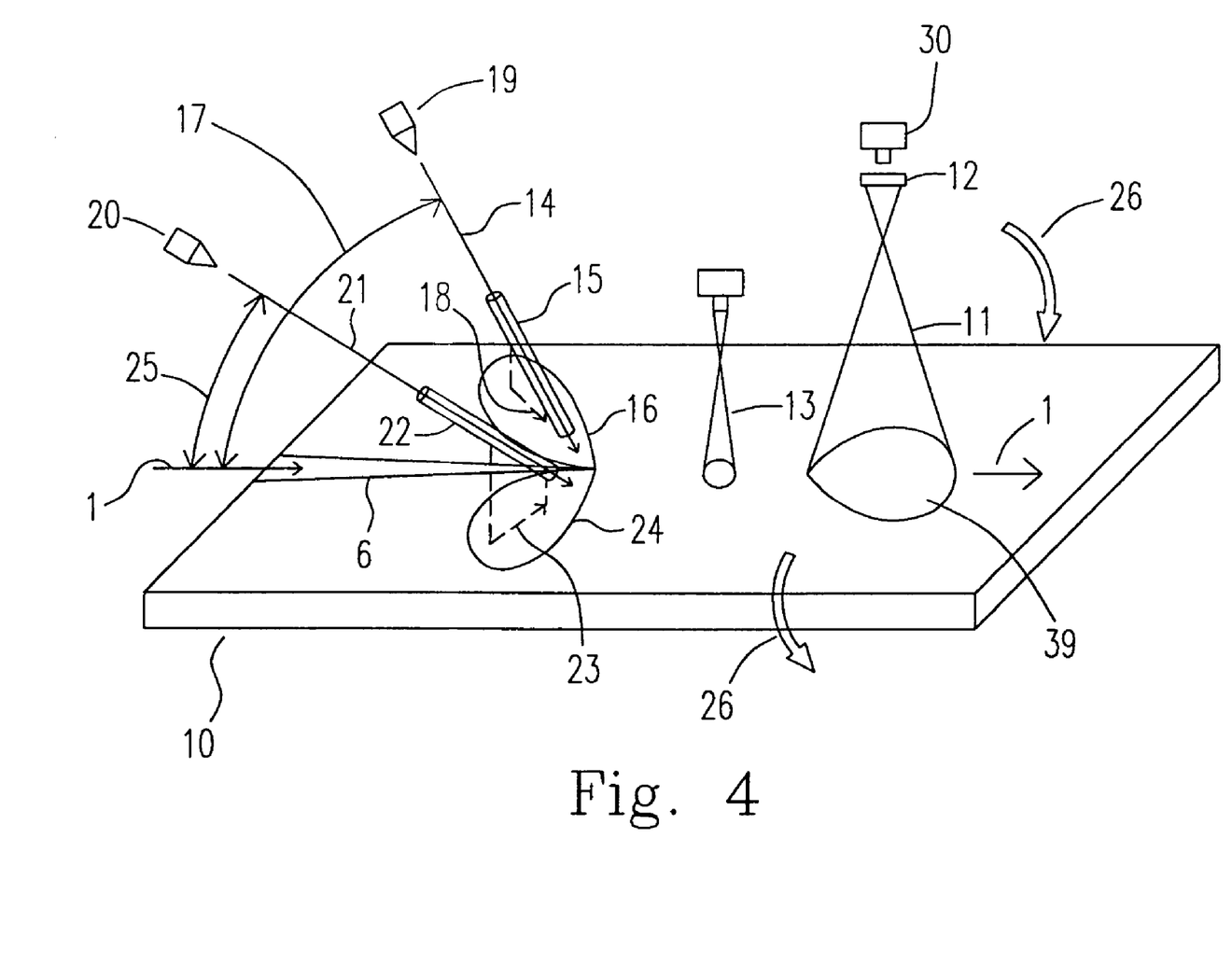
FIG. 4 is a diagram showing the method for cutting a nonmetal material according to another preferred embodiment of the present invention.

Please refer to FIG. 4, which is a diagram showing the method for cutting a nonmetal material according to another preferred embodiment in the present invention. To provide a tension stress on the surface 27 to be cut, a bending stress 26 is exerted thereon for the nonmetal material 10 in the method for cutting. Correspondingly, a thermal effect 39 is provided along a predetermined cutting path direction 1 on the nonmetal material 10. Desirably, the thermal effect 39 grows along a direction opposite to the cutting path direction 1, wherein the thermal effect 39 is generated by adjusting and focusing a first laser beam 11 to form a fan cross section therein through an optical device 12, so that the first laser beam 11 could have extremely high effective thermal weight values, and more operation power therefor is thus reduced to spare the cost. Furthermore, a second laser beam 13 is guided along the cutting path direction 1 following the first laser beam 11, through which the necessary ratio of the thermal weight to the power of laser on the cutting path direction 1 could be effectively increased for facilitating the cutting speed.

Subsequently, a first cryogenic effect 16 is provided along the cutting path direction 1 by a first cryogenic agent 15, which is generated in a first incident direction 14 by a first cooling source 19. As shown in FIG. 1, because a cryogenic phenomenon occurring in the first negative thermal weight area 4 could increase the ratio of thermal weight to power ($h^T/q$) and raise the quality and speed for cutting, desirably a first incident direction component 18 on the plane for the cutting path direction 1 from the projection of the first incident direction 14 is arranged to provide an oblique jet effect, so that the first cryogenic effect 16 would grow along the first incident direction component 18, which desirably meets the cutting path direction 1 at an angle of 60 degrees to effectively raise the negative thermal weight effect during the cutting process. According to the limitation conditions of the operation environment and the realistic workpiece to be cut, the first cryogenic agent 15 manages to be selected from a group consisting of water, air, and nitrogen, and one of a single nozzle or a multi-nozzle source is correspondingly adopted for the first cooling source 19.

Similar to the incident procedures for the first cooling source 19, a second cryogenic effect 24 is provided by a second cryogenic agent 22 generated by a second cooling source 20 in a second incident direction 21 along the cutting path direction 1. Correspondingly as shown in FIG. 1, because the cryogenic phenomenon occurring in the second negative thermal weight area 5 could still increase the ratio of thermal weight to power ($h^T/q$) and raise the quality and speed for the cutting process, a second incident direction component 23 on the plane for the cutting path direction 1 from the projection of the second incident direction 21 is arranged to provide another oblique jet effect, so that the second cryogenic effect 24 would grow along the second incident direction component 23, wherein the cutting path direction 1 is between the first incident direction component 18 and the second incident direction component 23, which desirably meets the cutting path direction 1 at another angle of 60 degrees to effectively raise the thermal weight effect during the cutting process.

Still according to the limitation conditions of the operation environment and the realistic workpiece to be cut, the second cryogenic agent 22 manages to be selected from a group consisting of water, air, and nitrogen, and one of a single nozzle or a multi-nozzle source is correspondingly adopted for the second cooling source 20. By the influences of the tension stress, the thermal effect 39, the first cryogenic effect 16, and the second cryogenic effect 24 provided along the cutting path direction 1, a crack 6 therealong is thus formed for the nonmetal material 10 to be cut.

Figure 5:
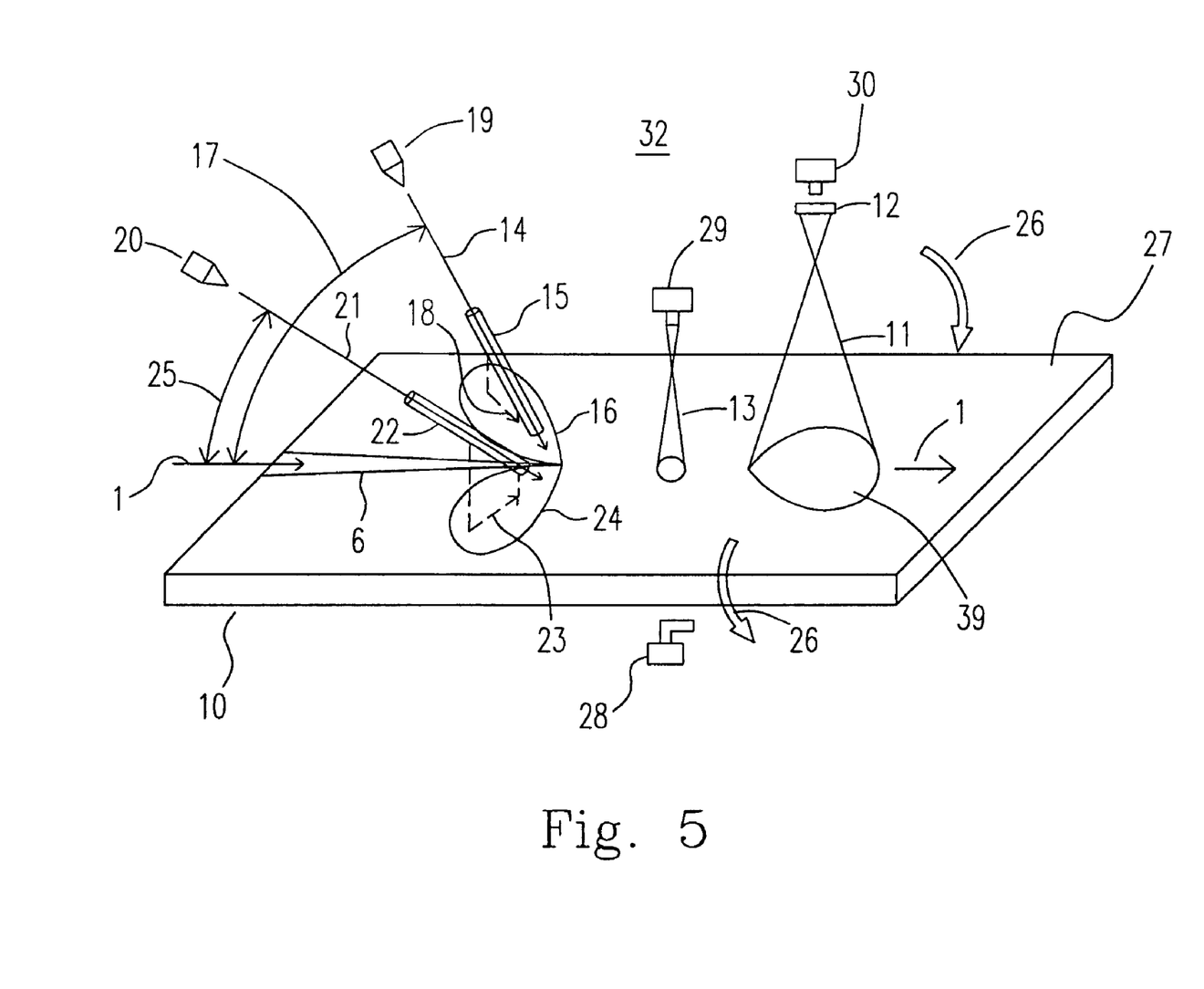
FIG. 5 is a diagram showing the cutting system for a nonmetal material according to a preferred embodiment of the present invention.

Please refer to FIG. 5, which is a diagram showing the system for cutting a nonmetal material according to another preferred embodiment in the present invention. The cutting system 32 has a tension generating device 28, a first heat source 30, a first cooling source 19, and a second cooling source 20, wherein the heat source 30 further includes an optical device 12. During the cutting process, the tension generating device 28 first exerts a bending stress 26 on a surface 27 to be cut on the nonmetal material to provide a tension stress thereon. Correspondingly, a thermal effect 39 is provided along a cutting path direction 1 predetermined on the nonmetal material 10 by a first laser beam 11 from the first heat source 30 through the optical device 12. Desirably, the thermal effect 39 grows along a direction opposite to the cutting path direction 1, wherein the optical device 12 could be a diffractive optical device to adjust and focus the first laser beam 11 to form a fan cross section therein, so that the first laser beam 11 could have extremely high effective thermal weight values, and more operation power therefor is thus reduced to spare the cost. Furthermore, a second heat source 29 is contained in the cutting system 32 to provide a second laser beam 13 guided along the cutting path direction 1 following the first laser beam 11, through which the ratio of the thermal weight to the necessary power for laser on the cutting path direction 1 could be effectively increased for facilitating the cutting speed.

Subsequently, a first cryogenic effect 16 is provided by a first cryogenic agent 15 in a first incident direction 14 from the first cooling source 19 along the cutting path direction 1. As shown in FIG. 1, because the cryogenic phenomenon occurring in a first negative thermal weight area 4 would increase the ratio of thermal weight to power ($h^T/q$) and raise the quality and speed for the cutting process, a first incident direction component 18 from the projection of the first incident direction 14 on the plane for the cutting path direction 1 is caused to provide another oblique jet effect, wherein the first incident direction component 16 desirably meets the cutting path direction 1 at an angle of 60 degrees so as to raise the negative thermal weight effect during the cutting process. According to the limitation conditions of the realistic workpiece to be cut and the operation environment, the first cryogenic agent 15 manages to be selected from a group consisting of water, air, and nitrogen, and one of a single nozzle and a multi-nozzle cooling source is correspondingly adopted for the first cooling source 19.

Similar to the incident procedures for the first cooling source 19, a second cryogenic effect 24 is provided by a second cryogenic agent 22 from a second cooling source 20 in a second incident direction 21 along the cutting path direction 1. As correspondingly shown in FIG. 1, because the cryogenic phenomenon occurring in a second negative thermal weight area 5 would still increase the ratio of thermal weight to power ($h^T/q$) and raise the quality and speed for the cutting process, a second incident direction component 23 on the plane for the cutting path direction 1 from the projection of the second incident direction 21 is caused to provide an oblique jet effect. Therefore, the second cryogenic effect 24 would grow along the second incident direction component 23, wherein the cutting path direction 1 is between the first incident direction component 18 and the second incident direction component 23, which desirably meets the cutting path direction 1 at an angle of 60 degrees to thus raise the thermal weight effect during the cutting process. According to the limitation condition of the realistic workpiece to be cut and the operation environment, the second cryogenic agent 22 could be one of water, air, and nitrogen, and one of a single and a multi-nozzle cooling sources could be correspondingly adopted for the second cooling source 20. By the influences of the tension stress, the thermal effect 39, and the first and second cryogenic effects 16 and 24 provided along the cutting path direction 1, a crack 6 is formed on the nonmetal material to be cut.

To summarize, the present invention proposes a method for cutting a nonmetal material, wherein a thermal effect growing along a direction opposite to a cutting path direction is provided, accompanied by correspondingly provided cryogenic effects, to facilitate the efficiency and speed for cutting the nonmetal material, thereby improving the drawbacks of the prior art. Thus, the present invention not only bears novelty and obviously progressive nature, but also bears the utility for the industry.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for cutting a brittle material, comprising steps of:
   generating a tension stress on a surface of the brittle material by exerting a bending stress thereon;
   providing a thermal effect along a path direction on the surface, wherein the thermal effect grows along a direction opposite to the path direction;
   providing a first cryogenic effect in a first incident direction along the path direction, wherein the first incident direction includes a first incident direction component and meets the path direction at a first angle; and
   providing a second cryogenic effect in a second incident direction along the path direction, wherein the second incident direction includes a second incident direction component and meets the path direction at a second angle, and the first incident direction component, the second incident direction component and the path direction are coplanar,
   wherein the first and second cryogenic effects proceed after the thermal effect, the first and second incident directions are on different sides of the path direction with respect to the surface of the brittle material, at least one of the first or the second incident direction components meets the path direction at an angle of about 60 degrees, and a crack along the path direction on the surface is formed as a result of the tension stress, the thermal effect, and the cryogenic effects therealong for cutting the brittle material.

2. The method as claimed in claim 1, wherein the first and second cryogenic effects respectively grow along the first and the second incident direction components.

3. The method as claimed in claim 1, wherein each of the first and the second incident direction components meets the path direction at an angle of 60 degrees.

4. A method for cutting a nonmetal, comprising steps of:
   providing a thermal effect along a path direction on the nonmetal, wherein the thermal effect grows along a direction opposite to the path direction;
   providing a first cryogenic effect in a first incident direction along the path direction; and
   providing a second cryogenic effect in a second incident direction along the path direction, wherein the first and the second incident directions respectively include a first and a second incident direction components, which are coplanar with the path direction,
   wherein the first and second cryogenic effects proceed after the thermal effect, the first and second incident directions are on different sides of the path direction with respect to the nonmetal, at least one of the first or the second incident direction components meets the path direction at an angle of about 60 degrees, and a crack along the path direction is formed as a result of the thermal and the first cryogenic effect therealong for cutting the nonmetal.

5. The method as claimed in claim 4, wherein each of the first and second cryogenic effects is provided by one of a single nozzle and a multi-nozzle cooling sources.

6. The method as claimed in claim 4, wherein the thermal effect is provided by a first laser beam.

7. The method as claimed in claim 6, wherein the first laser beam is adjusted by a diffractive optical device.

8. The method as claimed in claim 6 further comprising a step of guiding a second laser beam following the first laser beam along the path direction.

9. The method as claimed in claim 4, wherein the nonmetal is one of a single layer and a multi-layer brittle materials.

10. The method as claimed in claim 4, wherein the first and second cryogenic effects respectively grow along the first and the second incident direction components.

11. The method as claimed in claim 4, wherein the nonmetal is a glass substrate.

12. The method as claimed in claim 4, wherein the path direction is between the first and the second incident direction components.

13. The method as claimed in claim 4, wherein each of the first and the second incident direction components meets the path direction at an angle of 60 degrees.

14. The method as claimed in claim 4, wherein each of the first and the second cryogenic effects is provided through one selected from a group consisting of water, air, and nitrogen.

15. A cutting system for a glass substrate, comprising:
   a tension generating device generating a tension stress on a surface of the glass substrate;
   a first heat source exerting a thermal effect along a path direction on the surface, wherein the thermal effect grows along a direction opposite to the path direction;
   a first cooling source to provide a first cryogenic effect in a first incident direction along the path direction, wherein the first incident direction includes a first incident direction component and meets the path direction at a first angle; and
   a second cooling source to provide a second cryogenic effect in a second incident direction along the path direction, wherein the second incident direction includes a second incident direction component and meets the path direction at a second angle, and the first incident direction component, the second incident direction component, and the path direction therebetween are coplanar,
   wherein the first and second cryogenic effects proceed after the thermal effect, the first and second incident directions are on different sides of the path direction with respect to the surface of the glass substrate, at least one of the first or the second incident direction components meets the path direction at an angle of about 60 degrees, and a crack along the path direction on the surface is formed as a result of the tension stress, the thermal effect, and the cryogenic effects therealong for cutting the glass substrate.

16. The cutting system as claimed in claim 15, wherein the first and the second cryogenic effects respectively grow along the first and the second incident direction components.

17. The cutting system as claimed in claim 15, wherein each of the first and the second incident direction components meets the path direction at an angle of 60 degrees.

18. The cutting system as claimed in claim 15, wherein the tension generating device provides a force of bending stress to generate the tension stress.

19. The cutting system as claimed in claim 15, wherein the first heat source provides a first laser beam through a diffractive optical device to exert the thermal effect.

20. The cutting system as claimed in claim 19 further comprising a second heat source to guide a second laser beam following the first laser beam along the path direction.

* * * * *